Patented June 9, 1936

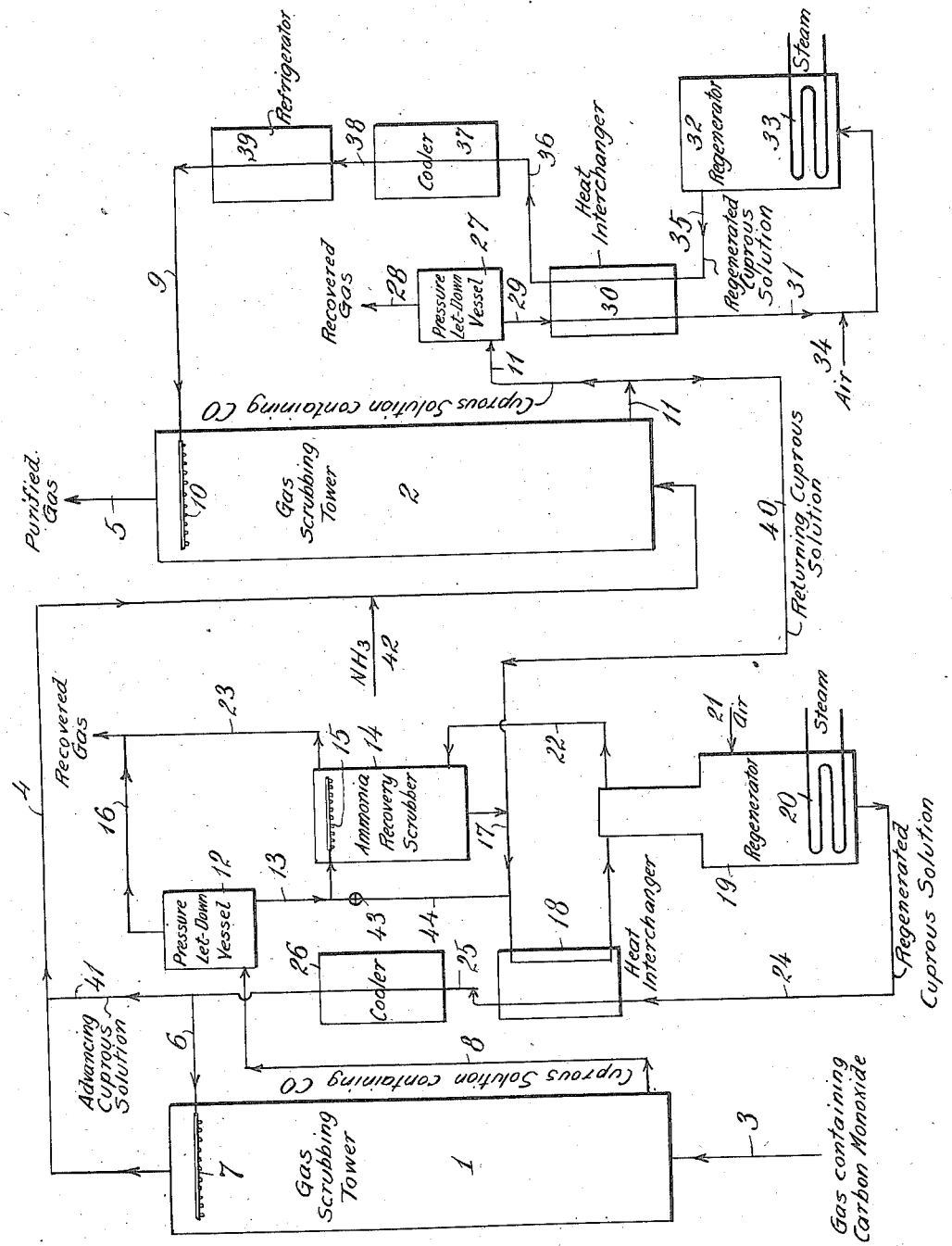

2,043,263

UNITED STATES PATENT OFFICE 2,043,263

PROCESS FOR PURIFYING GASES

Frank Porter, Syracuse, N. Y., assignor to Atmospheric Nitrogen Corporation, New York, N. Y., a corporation of New York Application February 20, 1931, Serial No. 517,193

13 Claims. (Cl. 23—2)

This invention relates to a process of purifying a gas of carbon monoxide. More particularly, the invention relates to a process of purifying a gas of carbon monoxide by treating it with ammoniacal cuprous solutions.

It is well known that ammoniacal cuprous solutions, such as solutions of cuprous chloride or carbonate, solutions of organic cuprous salts, etc., when contacted with a gas containing carbon monoxide, will absorb carbon monoxide from the gas. This property of such solutions has been employed for the purification of numerous types of gases as, for example, for the removal of carbon monoxide from water gas to yield a technical hydrogen suitable for use in balloons or for removing carbon monoxide from a hydrogen-containing gas which is later to serve for the synthesis of ammonia. According to one type of synthetic ammonia process, which is known as the de Jahn process, the gases which are to participate in the catalysis are first produced as a mixture in which the nitrogen content is approximately ⅓ of the sum of the hydrogen and carbon monoxide contents by volume. This gas is brought together with steam into contact with a catalyst adapted to the oxidation of carbon monoxide to carbon dioxide with the production of an equal volume of hydrogen. The resulting gases are then subjected to pressure and while under pressure treated for the removal of impurities. One of these impurities consists of a relatively small amount of carbon monoxide which remains in the gas as a result of incomplete reaction between the carbon monoxide and steam and this impurity is eliminated by passing the gases under pressure in contact with an ammoniacal cuprous solution.

The present invention will be particularly described in its application to the treatment of gases intended for ammonia synthesis. It is to be understood, however, that the invention is in no wise limited thereto, but is applicable to any case where it is desirous to absorb carbon monoxide in an ammoniacal cuprous solution from a mixture of gases containing the same. In its application to the ammonia synthesis art, the present invention may be considered as an improvement in a process such as that set forth above and in particular it may be considered as an improvement in a process for the purification of gases containing carbon monoxide such as is fully described in U. S. P. 1,597,345 to Jos. G. Dely, granted August 24, 1926. It is an object of this invention to provide a process whereby a gas of exceptionally high degree of purity with respect to its carbon monoxide content may be readily and economically obtained. The invention provides a process which eliminates from the gases being treated any relatively small amounts of carbon monoxide which may be present and in which the cuprous solution may be regenerated for renewed treatment of the gas in a relatively inexpensive and economical manner.

The completeness with which the carbon monoxide content of the gas may be removed is of particular importance when a relatively low pressure is used for the purification treatment. The invention is, therefore, of special importance where the purification pressures are relatively low as, for example, less than 50 atmospheres or where an extremely high degree of purification is desired.

Other objects of the invention will in part be obvious and will in part appear hereinafter.

In accordance with my invention, a gas containing carbon monoxide is subjected to treatment to purify it of the major proportion of the carbon monoxide and is then treated with an ammoniacal cuprous solution containing a high proportion of free ammonia to cuprous copper (more than about one part of free ammonia for every one part of cuprous copper) to substantially completely purify it of the residual carbon monoxide content. The invention comprises a process of treating a carbon monoxide gas with ammoniacal cuprous solution in which the proportion of free ammonia to cuprous copper in the solution increases as the amount of carbon monoxide in the gas is decreased by absorption of the carbon monoxide in the solution. In its preferred embodiment, my invention comprises treating a gas containing carbon monoxide in stages with a plurality of ammoniacal cuprous solutions. The gas is first treated with an ammoniacal cuprous solution for the removal of carbon monoxide and the thus partially purified gas is subsequently treated with an ammoniacal cuprous solution containing a higher proportion of free ammonia to cuprous copper than was contained in the first solution, to remove the residual carbon monoxide content of the gas. The two cuprous solutions are subjected to separate treatments for their regeneration; the regeneration of the first solution being preferably carried out in accordance with the process described in the above U. S. P. 1,597,345, and the regeneration of the second solution containing a higher proportion of free ammonia is preferably carried out by heating the solution under an appropriate pressure to oxidize the absorbed carbon monoxide to carbon dioxide.

The invention accordingly comprises the several steps and the relation of one or more of such steps with respect to each of the others thereof which will be exemplified in the process hereinafter disclosed and the scope of the invention will be indicated in the claims.

For a fuller understanding of the nature and objects of the invention, reference should be had to the following detailed description taken in connection with the accompanying drawing which represents diagrammatically a purification system in which the process of the invention may be carried out.

In the drawing, numerals 1 and 2 indicate two gas scrubbing towers through which a carbon monoxide-containing gas may be passed in series and under a pressure which may be upwardly to 50 or 100 atmospheres, by means of a pipe 3 entering the bottom of tower 1, a pipe 4 which communicates with the top of tower 1 and with the bottom of tower 2 and an exit pipe 5 leading from the top of tower 2. Towers 1 and 2 preferably containing a packing material to promote thorough contact between the cuprous solution and the gas. An ammoniacal cuprous solution is introduced from a pipe 6 through a spray device 7 into the top of tower 1 and passes downwardly through the tower and in intimate contact with the gas passing therethrough and acts to absorb carbon monoxide from the gas together with any carbon dioxide contained therein. The solution containing absorbed carbon monoxide is withdrawn from the bottom of tower 1 through a pipe 8 and passes to a regeneration system which will be more completely described hereinafter, wherein the solution is regenerated before returning through pipe 6 for renewed treatment of the gas. In the purification of a gas containing more than about 0.1% of carbon monoxide, it is employing the process of this invention, it is preferable to so regulate the conditions of treatment of the gas in tower 1 (the pressure, temperature, effectiveness of contact between solution and gas, amount of solution, etc. employed in the treatment of the gas) that it is purified to such an extent that the gas leaving the tower contains no more than about 0.1% of carbon monoxide. This gas passes through pipe 4 to the bottom of tower 2, where it is again treated with an ammoniacal cuprous solution introduced with a pipe 9 into the top of the tower through from a spray device 10. The ammoniacal solution introduced into tower 2 for treatment of the gas therein contains a higher proportion of free ammonia to cuprous copper than is contained in the solution employed in tower 1 for the preliminary purification of the gas. It is preferred to employ in tower 2 a solution containing more than about one part of free ammonia for every one part of cuprous copper particularly when, as described above, the preliminary purification treatment is regulated so that a gas containing not more than about 0.1% of carbon monoxide enters tower 2 for treatment therein. The ammoniacal solution containing absorbed carbon monoxide passes out of the bottom of tower 2 through a pipe 11 to a second regenerator system, which is more completely described hereinafter, and the regenerated liquid is returned through pipe 9 for renewed treatment of the gas passing through tower 2.

The solution employed in tower 1 may contain free ammonia and cuprous copper in the proportion (by weight) of 6 to 9 parts of free ammonia to 9 to 11 parts of cuprous copper. A solution of the following composition expressed as grams of the constituents per 100 cc. of solution is suitable:

| | |
|---|---|
| Total copper | 11.0 |
| Cuprous copper | 10 |
| Total ammonia | 12 |
| Carbon dioxide | 8 |
| Free ammonia | 8 |
| Total organic acids | 3.5 |

As has been stated above, the solution employed for treatment of the gas in tower 2 contains a higher proportion of free ammonia to cuprous copper than does the solution employed in tower 1. A solution containing 12 to 18 parts by weight of free ammonia to 8 to 10 parts by weight of cuprous copper is suitable for use in tower 2. The solution may, for example, have the following composition expressed as grams of the constituents per 100 cc. of solution:

| | |
|---|---|
| Total copper | 9.5 |
| Cuprous copper | 8.5 |
| Total ammonia | 20. |
| Carbon dioxide | 12.8 |
| Free ammonia | 12 |
| Organic acids | 3.0 |

The foregoing compositions of solutions are given by way of illustration only and the invention is applicable to other ammoniacal cuprous solutions which may be operative for the purposes under consideration. For example, solutions of more or less copper content may be used, in which case a corresponding change in the other constituents should also be made.

As noted above, however, the ammoniacal cuprous solution employed in tower 2 contains a higher proportion of free ammonia to cuprous copper than does the solution employed in tower 1 and, furthermore, it is preferred to employ in tower 2 a solution containing more than about one part of free ammonia to every one part of cuprous copper, particularly when the gas introduced thereinto contains not more than about 0.1% of carbon monoxide.

Referring again to the accompanying drawing, the ammoniacal cuprous solutions withdrawn from the bottoms of towers 1 and 2 are separately regenerated for reuse. The solution from tower 1 passes through pipe 8 to a pressure let-down vessel 12 and thence through a pipe 13 into the top of an ammonia recovery scrubber where it is sprayed from a spray device 15. Any gas accompanying the solution or which becomes dissociated therefrom in pressure let-down vessel 12 escapes from this vessel through a pipe 16. The liquid after passing through scrubber 14 flows through a pipe 17 to a heat interchanger 18 and thence to a regenerator 19 where it is heated with steam passed through steam coils 20 and is treated with air introduced from a pipe 21. The solution is preferably heated in the regenerator to a temperature of approximately 70–75° C. Carbon monoxide and some ammonia and and carbon dioxide are evolved from the solution by the heat treatment in regenerator 19 and these gases are passed through a pipe 22 to scrubbed 14 where they are contacted with the incoming solution from pipe 13. Ammonia is absorbed in the solution and the carbon monoxide, with any unabsorbed ammonia and the carbon dioxide, escapes through a pipe 23. The air injected into the solution serves to oxidize cuprous copper to the cupric condition and by a proper control of the volume of air, a relatively constant cupric condition in the solution may be maintained. This method of regenerating the cuprous solution is, in general, the same as that disclosed in U. S. P. 1,597,345 to which reference should be made for a more detailed description of the several features and conditions of operation of the regeneration. The regenerated cuprous solution passes through pipe 24 to a heat exchanger 18, in which it is passed in heat exchange with the solution from pipe 17 on its way to regenerator 19. A pipe 25, cooler 26 and a pipe 6 serve to conduct the regenerated solution to the top of tower 1.

The cuprous solution leaving the bottom of tower 2 through pipe 11 is passed to a pressure let-down vessel 27 from which any gas accompanying the solution or dissociated therefrom in vessel 27 escapes through a pipe 28. The solution passes from vessel 27 through a pipe 29, heat interchanger 30 and pipe 31 into a regenerator vessel 32. In regenerator vessel 32 the solution is heated by means of steam passed into a steam coil 33 to a temperature which may be, for example 70–100° C., and is held in regenerator 32 until the carbon monoxide content is oxidized to carbon dioxide by means of the cupric content of the solution. The solution in regenerator 32 is maintained under a pressure which may be of from 5–50 lbs. per square inch. The desired pressure in regenerator 32 may be maintained either by incompletely relieving the pressure upon the solution in pressure let-down vessel 27 or by introducing the solution into regenerator 32 by means of a pump. Air is introduced into contact with the cuprous solution, for example, from a pipe 34 which communicates with pipe 31 and introduces the air into the solution flowing therethrough. The amount of air is regulated to maintain the desired cupric composition of the solution after oxidation of the carbon monoxide has taken place in regenerator 32. The oxidation of the carbon monoxide may, therefore, be considered as being an oxidation by means of the air introduced from pipe 34, the copper content of the solution serving as an oxygen carrier, the cuprous copper being oxidized by the air to the cupric state and carbon monoxide being oxidized to carbon dioxide by means of cupric copper which is in turn reduced to cuprous copper.

The temperature to which the solution in regenerator 32 is heated is dependent both upon the free ammonia content of the solution and the pressure at which the regenerator is operated. A high free ammonia content in the solution limits the temperature to which it may be heated in the regenerator since this should not be operated too near the boiling point of the solution, otherwise carbon monoxide will be driven out of the solution and this limits the extent of carbon monoxide oxidation to carbon dioxide by the cupric copper. By thus heating the solution to a temperature and under a pressure such that carbon monoxide is not evolved from the solution, the carbon monoxide in the solution in regenerator 32 is oxidized while the solution is out of contact with a gas phase containing carbon monoxide. In general, the higher the free ammonia content the lower must be the temperature of the regenerator for a given pressure or the higher must be the pressure at which the regenerator is operated at a given temperature. As has been stated, when employing a solution of the composition noted above in gas scrubbing tower 2, and operating the regenerator under a pressure of from 5–50 lbs. per square inch gauge, the solution may be heated to temperatures up to about 70–100° C. to completely remove the carbon monoxide from the solution by oxidation at an adequate rate so that the solution need not be retained in the regenerator for an excessively prolonged period of time. It is apparent, of course, that higher temperatures may be used if the solution contains a lower concentration of ammonia or if the regenerator is operated at a higher pressure.

The regenerated solution passes from regenerator 32 through a pipe 35, heat interchanger 30, pipe 36, cooler 37, pipe 38, refrigerator 39 and pipe 9 to the top of tower 2 where it is again brought into contact with the gas passing therethrough. It has been found that by cooling the ammoniacal cuprous solution in refrigerator 39 to a temperature of about 0° C., that the removal of carbon monoxide from the gases treated with the cooled solution in tower 2 is particularly effective.

The carbon dioxide formed by oxidation in regenerator 32 of carbon monoxide combines with free ammonia contained in the solution. In order to maintain the desired concentration of free ammonia and a substantially constant composition of the solution with respect to its ammonium carbonate content, a suitable amount of solution employed in scrubbing tower 2 and the regenerator system operating in connection therewith, which constitutes a secondary gas purification system, is traded for an equivalent amount of the solution employed in tower 1 and its regenerator system, which constitutes a primary gas purification system. This may be accomplished for example by returning to the solution flowing through pipe 17 to heat interchanger 18 a desired proportion of the solution leaving tower 2 through pipe 11 by way of a pipe 40. As described above, carbon dioxide and ammonia are evolved from the solution in regenerator 19 along with carbon monoxide. Ammonia is recovered in scrubber 14 and the carbon dioxide passes out of the system through pipe 23 together with the carbon monoxide and any residual unrecovered ammonia. A portion of the solution in passing to tower 1 through pipe 6 is introduced into tower 2 by way of a pipe 41 and pipe 4 in amount sufficient to replace in the secondary system the solution withdrawn through pipe 40. This advancing solution from pipe 41 contains, however, a smaller proportion of free ammonia than is contained in the solution in the secondary system. There is, therefore, a continuous transfer of ammonia from the secondary system to the primary system which is compensated for by the addition of free ammonia to the solution in the secondary system as, for example, by introducing ammonia through a pipe 42 into the gas passing through pipe 4 into tower 2. In the primary scrubbing system any carbon dioxide in the gas introduced to tower 1 or formed during a regeneration of the ammoniacal cuprous solution employed therein will likewise react with free ammonia on the solution to form ammonium carbonate. The ammonium carbonate content of the solution in the primary system is likewise augmented by that contained in the returning solution from the secondary system. The ammonium carbonate content of the solution is maintained substantially constant by the evolution of ammonia and carbon dioxide from the solution in regenerator 19 and the elimination of carbon dioxide from the system in the gas escaping from scrubber 14. The process, accordingly, provides for the oxidation of carbon monoxide absorbed in tower 2 to carbon dioxide which forms ammonium carbonate with the free ammonia content of the solution. The ammonium carbonate thus formed is transferred to the primary system with the returning solution and a corresponding quantity of carbon dioxide is eliminated from this system in the gases leaving scrubber 14. All of the carbon monoxide removed from the gas both in tower 1 and in tower 2 is removed from the absorption system during the regeneration of the solution in the primary purification system, either in the form of carbon monoxide or as an equivalent quantity of carbon dioxide.

The gas escaping from the system through pipe 23 carries ammonia with it the amount of which is dependent upon the conditions of operation of the scrubber; for example, the temperature, pressure and the amount of solution passed through scrubber 14. This latter factor may be varied by opening or closing a valve 43 in a by-pass line 44 whereby a greater or lesser proportion of the solution passing to scrubber 14 may be by-passed from pipe 13 to pipe 17. There is likewise a certain amount of the ammonia content of the ammoniacal cuprous solution which is given up to the gas being purified in towers 1 and 2 which also must be replaced in the cuprous solutions. By a proper correlation of the amount of ammonia allowed to escape with the carbon dioxide from the primary system through pipe 23 and the amount of ammonia passing through pipe 4 with the purified gas from tower 1 and escaping from tower 2 through pipe 5, with the amount of free ammonia and ammonium carbonate introduced into the primary system with the returning cuprous solution from pipe 40 and the amount of free ammonia introduced into the secondary system, a balance of the conditions of operation may be maintained whereby the desired composition of the solutions employed in both the primary and the secondary systems may be held substantially constant.

Since certain changes may be made in carrying out the above process without departing from the scope of the invention, it is intended that all matter contained in the above description shall be interpreted as illustrative and not in a limiting sense. When, in this specification and in the claims reference is made to "free ammonia", it is intended to refer to ammonia which is not in chemical combination with an acid as for example combined in the form of ammonium carbonate. It is generally considered, however, that in ammoniacal cuprous solutions ammonia is combined as an additive compound with the cuprous salt and the term "free ammonia" is intended to include ammonia present in the solution in this type of combination.

I claim:

1. In the process of purifying a gas of carbon monoxide by treatment with ammoniacal cuprous solution, that improvement which comprises contacting said gas with ammoniacal cuprous solution of increased proportion of free ammonia to cuprous copper as the amount of carbon monoxide in said gas is decreased by absorption in said solution.

2. In the process of purifying a gas of carbon monoxide, that improvement which comprises removing a portion of the carbon monoxide contained in said gas by treatment thereof with ammoniacal cuprous solution and then removing a further quantity of said carbon monoxide by treating the partially purified gas with an ammoniacal cuprous solution containing a higher proportion of free ammonia to cuprous copper than said first mentioned cuprous solution.

3. The process of purifying a gas of carbon monoxide which comprises treating said gas in stages with a plurality of ammoniacal cuprous solutions wherein said gas is contacted with an ammoniacal cuprous solution and is subquently contacted with an ammoniacal cuprous solution containing a higher proportion of free ammonia to cuprous copper than said first mentioned cuprous solution.

4. The process of purifying a gas of carbon monoxide which comprises treating said gas in stages with a plurality of ammoniacal cuprous solutions wherein said gas is contacted with an ammoniacal cuprous solution containing about 6 to 9 parts of free ammonia to every 9 to 11 parts of cuprous copper and is subsequently contacted with an ammoniacal cuprous solution containing about 12 to 18 parts of free ammonia to every 8 to 10 parts of cuprous copper.

5. The process of purifying a gas of carbon monoxide which comprises treating said gas in stages with a plurality of ammoniacal cuprous solutions wherein said gas is contacted with an ammoniacal cuprous solution and is subsequently contacted with an ammoniacal cuprous solution containing a higher proportion of free ammonia to cuprous copper than said first mentioned cuprous solution, withdrawing said solutions from contact with said gas, and separately regenerating the withdrawn solutions.

6. The process of purifying a gas of carbon monoxide which comprises contacting said gas with an ammoniacal cuprous solution, contacting the thus treated gas with an ammoniacal cuprous solution containing a higher proportion of free ammonia to cuprous copper than said first mentioned cuprous solution, oxidizing carbon monoxide absorbed in said second cuprous solution to form ammonium carbonate, transferring the ammonium carbonate thus produced to said first mentioned cuprous solution, and eliminating a corresponding quantity of carbon dioxide from said first mentioned cuprous solution.

7. The process of purifying a gas of carbon monoxide which comprises contacting said gas with an ammoniacal cuprous solution containing about 6 to 9 parts of free ammonia to every 9 to 11 parts of cuprous copper, contacting the thus treated gas with an ammoniacal cuprous solution containing about 12 to 18 parts of free ammonia to every 8 to 10 parts of cuprous copper, oxidizing carbon monoxide absorbed in said second cuprous solution to form ammonium carbonate, transferring the ammonium carbonate thus produced to said first mentioned cuprous solution, and eliminating a corresponding quantity of carbon dioxide from said first mentioned cuprous solution.

8. The process of purifying a gas of carbon monoxide which comprises contacting said gas with an ammoniacal cuprous solution, withdrawing the cuprous solution containing absorbed carbon monoxide from contact with the thus treated gas, heating the withdrawn solution to evolve carbon monoxide therefrom, contacting said treated gas with an ammoniacal cuprous solution containing a higher proportion of free ammonia to cuprous copper than the first mentioned solution, withdrawing said second cuprous solution containing absorbed carbon monoxide from contact with the thus treated gas, introducing oxygen into the withdrawn solution and heating said solution under pressure to oxidize carbon monoxide contained therein.

9. The process of purifying a gas of carbon monoxide which comprises contacting said gas with an ammoniacal cuprous solution containing not more than about one part of free ammonia for every one part of cuprous copper, withdrawing the cuprous solution containing absorbed carbon monoxide from contact with the thus treated gas, heating the withdrawn solution to evolve carbon monoxide therefrom, contacting said treated gas with an ammoniacal cuprous solution containing more than about one part of free ammonia for every one part of cuprous copper, withdrawing said second cuprous solution containing absorbed carbon monoxide from contact with the thus treated gas, introducing oxygen into the withdrawn solution and heating said solution under pressure to oxidize carbon monoxide contained therein.

10. The process of purifying a gas of carbon monoxide which comprises absorbing a portion of the carbon monoxide contained therein by treatment with an ammoniacal cuprous solution, removing a further quantity of carbon monoxide from said gas by contacting the thus treated gas with a second ammoniacal cuprous solution containing a higher proportion of free ammonia to cuprous copper than said first mentioned ammoniacal solution, interchanging portions of said cuprous solutions in amounts regulated to maintain substantially constant the free ammonia content of the first mentioned solution and the ammonium carbonate content of said second cuprous solution, heating the first mentioned cuprous solution to remove therefrom carbon monoxide and carbon dioxide, heating said second cuprous solution under pressure to oxidize carbon monoxide contained therein to carbon dioxide by means of oxygen introduced thereto, introducing free ammonia into said second solution in an amount to maintain substantially constant its free ammonia content, and treating another portion of said gas containing carbon monoxide with the thus regenerated ammoniacal cuprous solutions.

11. The process of purifying a gas of carbon monoxide which comprises absorbing a portion of the carbon monoxide contained therein by treatment under pressure with an ammoniacal cuprous solution containing about 6 to 9 parts of free ammonia to every 9 to 11 parts of cuprous copper, removing a further quantity of carbon monoxide from said gas by contacting the thus treated gas with a second ammoniacal cuprous solution containing about 12 to 18 parts of free ammonia to every 8 to 10 parts of cuprous copper, interchanging portions of said cuprous solutions in amounts regulated to maintain substantially constant the free ammonia content of the first mentioned solution and the ammonium carbonate content of said second cuprous solution, heating the first mentioned cuprous solution to remove therefrom carbon monoxide and carbon dioxide, heating said second cuprous solution to a temperature of about 70° C. to 100° C., under a pressure of about 5 to 50 pounds per square inch to oxidize carbon monoxide contained therein to carbon dioxide by means of oxygen introduced thereto, introducing free ammonia into said second solution in an amount to maintain substantially constant its free ammonia content, and treating another portion of said gas containing carbon monoxide with the thus regenerated ammoniacal cuprous solutions.

12. The process of purifying a gas of carbon monoxide which comprises contacting said gas at an elevated pressure with an ammoniacal cuprous solution and then with a second ammoniacal cuprous solution, separately withdrawing said solutions from contact with said gas, reducing the pressure upon the first mentioned cuprous solution and recovering carbon monoxide therefrom, and heating said second cuprous solution out of contact with a gas phase containing carbon monoxide under a pressure above atmospheric to oxidize carbon monoxide contained therein to regenerate said solution with respect to its carbon monoxide content for renewed contact with said gas.

13. The process of purifying a gas of carbon monoxide which comprises contacting said gas at an elevated pressure with an ammoniacal cuprous solution and then with a second ammoniacal cuprous solution, separately withdrawing said solutions from contact with said gas, reducing the pressure upon the first mentioned cuprous solution and recovering carbon monoxide therefrom, heating said second cuprous solution under a pressure above atmospheric to oxidize carbon monoxide contained therein to form ammonium carbonate, transferring ammonium carbonate thus produced to said first mentioned cuprous solution, and eliminating a corresponding quantity of carbon dioxide therefrom.

FRANK PORTER.